Figure 1:
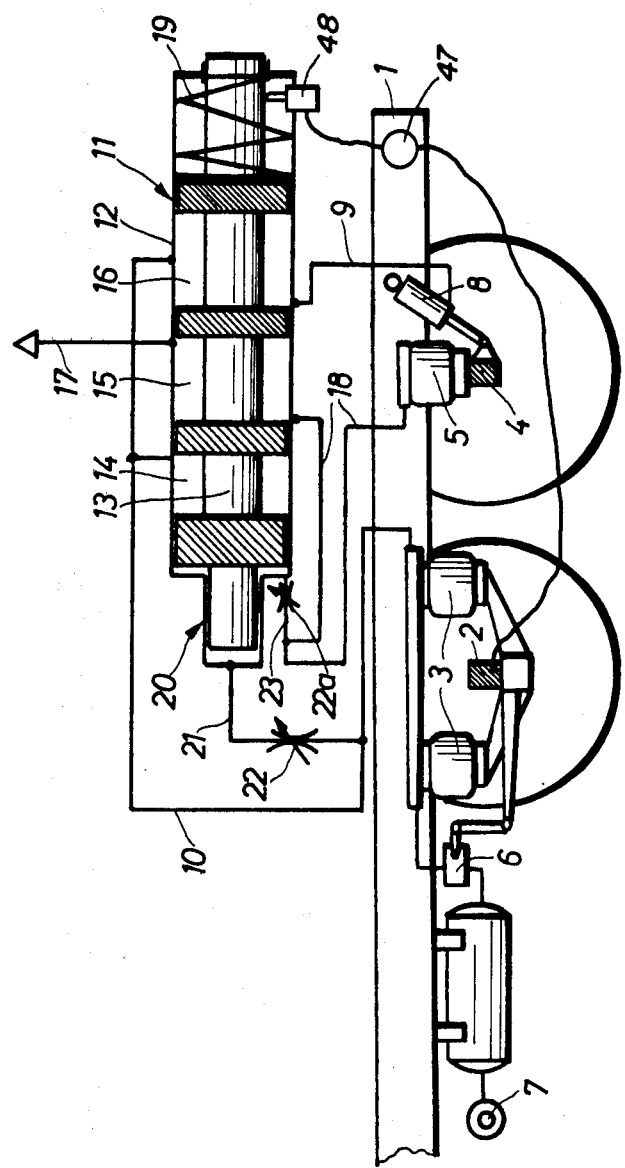

United States Patent [19]

Carstensen et al.

[11] 4,284,156
[45] Aug. 18, 1981

[54] VEHICLE WITH AT LEAST THREE AXLES

[75] Inventors: Jes-Ernst Carstensen; Walter Nau, both of Cologne, Fed. Rep. of Germany

[73] Assignee: Klöckner-Humboldt-Deutz Aktiengesellschaft, Cologne, Fed. Rep. of Germany

[21] Appl. No.: 21,820

[22] Filed: Mar. 19, 1979

[30] Foreign Application Priority Data

Mar. 18, 1978 [DE] Fed. Rep. of Germany ....... 2811874

[51] Int. Cl.³ .............................................. B62D 61/12
[52] U.S. Cl. ................................ 180/24.02; 280/81 R; 280/682; 280/683
[58] Field of Search .................. 180/24.02; 280/81 R, 280/682, 683

[56] References Cited

U.S. PATENT DOCUMENTS

| 3,055,678 | 9/1962 | Alfieri | 280/683 |
| 3,197,231 | 7/1965 | Holzman | 280/683 |
| 3,201,141 | 8/1965 | Bernstein et al. | 180/24.02 |
| 3,282,601 | 11/1966 | Harbers | 280/81 R |
| 3,494,632 | 2/1970 | Bostrom | 280/683 |
| 3,499,663 | 3/1970 | Hedlund et al. | 180/24.02 |
| 3,659,671 | 5/1972 | Heinze | 180/24.02 |
| 4,141,430 | 2/1979 | Eddy, Jr. | 180/24.11 |

FOREIGN PATENT DOCUMENTS 556760 12/1974 Switzerland .......................... 180/24.02

Primary Examiner—David M. Mitchell
Assistant Examiner—Donn McGiehan
Attorney, Agent, or Firm—Becker & Becker, Inc.

[57] ABSTRACT

A vehicle with at least three axles two of which are combined to form a double-axle unit and which are resiliently connected to a frame. The vehicle furthermore comprises a first device for automatically lifting and lowering one axle of the double-axle unit while a control element is provided for controlling the lifting and lowering device in conformity with the respective axle load. The vehicle also comprises a second device which ascertains the respective total vehicle load to be taken over by the respective double-axle unit or the measured values of the vehicle load and actuates the control element in conformity with the total vehicle load or ascertained measured values.

9 Claims, 2 Drawing Figures

VEHICLE WITH AT LEAST THREE AXLES

The present invention relates to a vehicle with at least three axles while two axles have been combined in a double-axle unit and are resiliently connected to the frame. The vehicle is furthermore provided with a device for automatically lifting and lowering an axle of the double-axle unit while there is furthermore provided an element for controlling the lifting device in conformity with the axle load.

U.S. Pat. No. 3,201,141 Bernstein et al issued Aug. 17, 1965 describes a vehicle of the above mentioned general type according to which the spring arrangement between the frame and the axles is designed as air spring bellows, while an air lifting bellows is provided. The control of the lifting device is effected by way of a valve which in conformity with the pressure of the spring bellows of the non-liftable axle controls the air spring bellows and the lifting bellows of the liftable axle. With this lifting device, the following problem is encountered. If for instance both axles are lowered, and if the load of the vehicle is decreased, the pressure in the spring bellows drops to such an extent that at a certain value, a reversal of the valve is effected whereby the air spring bellows of the liftable axle is vented and the lifting bellows is inflated so that the liftable axle is raised. As a result thereof, however, the non-liftable axle must take over the load which was previously carried by the liftable axle so that the pressure in the spring bellows of this last mentioned axle increases again to a value at which both axles should be lowered so that a reversal of the valve and a lowering of the liftable axle will be effected. This operation can be repeated at will within a certain operational range so that a major problem is encountered in this connection.

It is therefore, an object of the present invention to overcome the above mentioned drawbacks and to provide a lifting device which under all conditions of operation will operate safely and will control the lifting device in the desired direction.

These and other objects and advantages of the invention will appear more clearly from the following specification in connection with the accompanying drawings, in which:

FIG. 1 diagrammatically illustrates a double-axle unit with automatic lifting device, according to which the axles are spring cushioned through the intervention of spring bellows on the vehicle frame.

Figure 2:
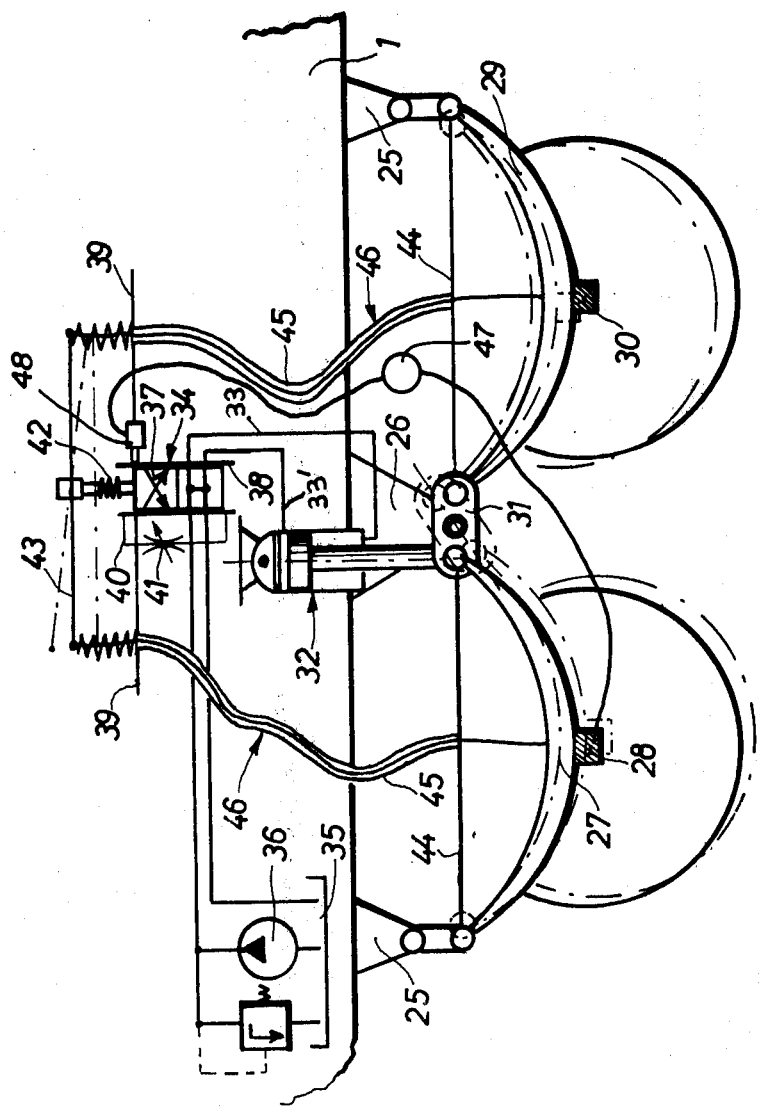

FIG. 2 shows a double-axle unit with automatic lifting device similar to that of FIG. 1, according to which the axles by way of mechanical leafsprings are connected to the vehicle frame.

The vehicle of the present invention with at least three axles is characterized primarily by a device which ascertains the respective total load to be taken over from the double-axle unit of the vehicle or the corresponding measured values of the vehicle load and which triggers the control element in conformity with said load or said measured values. Due to the fact that now the load is measured on both axles, the arrangement of the present invention will assure that the load acting upon the entire unit serves as a measurement for the control so that no falsification can occur. The measured values which correspond to the load of the vehicle may for instance be as follows: the pressure in the tires, the bending of the axles or also the pressure on the spring supports for instance with mechanical springs measured by electrical or hydraulic emitters. These measured value emitters may be arranged separately on both sides of the vehicle and may be interconnected in such a way that the medium load is measured. The suggestion according to the present invention as set forth above may be applied with any desired axle suspensions and with any desired spring types. It is merely important to make sure that the lifting device so coacts with the device ascertaining the load of the liftable axle, that the device with lifted axle will also indicate the load condition "zero" (the load of the liftable axle itself being disregarded). Therefore, the lifting device must not lift the axle against the thrust of the spring of the liftable axle, when within the region of the spring support or on the springs themselves, the device is arranged for ascertaining the load and when this load would not be relieved.

According to a further development of this invention, the emitter elements and/or the control element include a time element or a low pass whereby only load values existing over a longer period of time bring about an adjustment of the control element.

This feature is intended to assure that short time load peaks created by unevenness in the driving lanes are not resorted to as measurement for the load and no faulty controls can occur. Independently of these features, it is also possible to switch off the entire control device during the driving of the vehicle and the last control position is permanently maintained while the vehicle is standing, i.e. prior to the starting of the driving of the vehicle. This is possible for instance by a locking of the control element. Such a step is very simple and effective, inasmuch as it can be stated from the fact that the vehicle is not loaded or unloaded while it is being driven but that such loading or unloading is effected while the vehicle is at a standstill.

According to a still further development of the invention, the control device may be provided with a measuring device as it is advantageously employed with an air spring equipped vehicle. By means of the two pistons of the emitter elements or by the step piston it will be assured that if the liftable axle is lowered, the pressure in the spring bellows of both axles is being ascertained and serves as measurement for the load in combination with the corresponding piston surface. If the liftable axle is lifted, only the pressure in the spring bellows serves as measuring factor in the non-liftable axle. In this connection, the drawbacks of the devices according to the above mentioned U.S. Patent cannot occur because an increase in pressure of the spring bellows of the non-liftable axle is eliminated by the omission of the pressure and thus of the load acting upon the second piston or second piston surface by lifting the liftable axle. On the other hand, the pressure drop in the spring bellows of the non-liftable axle, and the reduction in the force upon the first piston or on this piston surface is equalized by acting upon the second piston or this piston surface by venting the spring bellows of the liftable axle.

The present invention furthermore assures that also with an axle arrangement provided with a compensating effect, the tilting movements of the axles caused by unevenness in the ground are not present as measurement for the control of the lifting device and thereby cause faulty control operations, because the distance between the yokes and the springs in the maximum spring lifting range now forms a measurement of the axle load. The present invention furthermore assures that the control element may be arranged in any desired well protected area and that only the effective load dependent spring-through of the axles is employed as measurement for the control. The control beam will in this connection meet the above explicitly described effects of the pistons of the emitter elements or of the step piston so that always the actual load of the load portion of the vehicle pertaining to the double-axle unit is measured and conveyed to the control element.

Referring now to the drawings in detail, the vehicle frame 1, which is shown in part only, leads to at least a further axle of the vehicle. The vehicle frame 1 on one hand spring is cushioned on a non-liftable axle 2 by way of spring bellows 3, and is furthermore spring loaded on a liftable axle 4 through spring bellows 5. The spring bellows 3 of the non-liftable axle 2 are interconnected and by way of a level control valve 6 are connected to a source 7 of compressed air. Arranged on the liftable axle 4 is a lifting cylinder device 8 the pressure side of which communicates with a conduit 9 for a pressure medium. Connected to the spring bellows 3 is a compressed air conveying conduit 10 which leads to a control element generally designated with the reference numeral 11. The control element 11 has a control bushing 12 and a control valve or valve spool 13 for controlling three control chambers 14, 15, and 16 which are cylindrical chambers closed off from each other by pistons. The compressed air conveying conduit 10 within the region of the control chambers 14 and 15 is connected in such a way that it communicates with said control chambers only, while the compressed air conveying conduit 9 is so connected to the control bushing 12 that an operative connection can be established between the conduit 9 and the control chambers 15 and 16. Furthermore connected to the control bushing 12 is a venting conduit 17 which is in permanent communication with the control chamber 15. Connected to the spring bellows 5 is a pressure conveying conduit 18 which is so arranged on the control bushing 12 that it can be brought into communication selectively with the control chambers 14 and 15. The control valve 13 is axially displaceable and by means of a spring 19 is urged in the direction of the illustrated position of the control valve. When the control valve 13 is in the illustrated position, the pressure conveying conduit 18 through the control chamber 15 is in communication with the venting connection 17, and the pressure medium conveying conduit 9 is in operative connection with the pressure conveying conduit 10 by way of the control chamber 16 so that the liftable axle is lifted. The control valve 13 has that side thereof which faces away from the spring 19 provided with a step piston 20 with a circular end face and an annular end face. The conduit 10 is connected to the circular end face through a conduit 21 which has interposed a throttle, preferably an adjustable throttle 22. The annular end face is connected through a conduit 23 with adjustable throttle 22a to the pressure line 18. The throttles 22 and 22a are time elements so that short-term pressure variations in the spring bellows 3 and 5 will not cause any displacement of the control valve or valve spool 13. If in view of loading the vehicle in the illustrated lifted position the pressure in the spring bellows 3 increases beyond a certain pressure, the step piston 20 in view of the force acting upon the circular end face displaces the control valve 13 toward the right so that the pressure line 18 will be in communication with the pressure line 10, and the pressure medium conveying line 9 will be in communication with the venting connection 17. As a result thereof, the liftable axle 4 is lowered and takes over its load component. At the same time, the annular end face of the stepped piston 20 through conduit 23 and the adjustable throttle 22a is under the load of the pressure in the spring bellows 5 so that the pressure drop in the spring bellows 3 will be compensated for by taking over a load portion of the liftable axle which results in a pressure drop on the circular end face. The control valve 13 remains in the position displaced relative to FIG. 1. It should be borne in mind that the end faces of the stepped piston are so correlated with the thrust of the spring 19 and the load distribution of the axles and the pressure in the spring bellows 3 and 5 that no displacement of the control valve or valve spool 13 will be caused by the change in load in combination with the lifting and lowering. The lifting device 8 depending on the design also may be embodied for instance as a hydraulic lifting device with its own hydraulic circuit. The lifting device is operatively connected with the pressure conduit 9 or to the control bushing 12. Instead of the adjustable throttles 22 and 22a designed as timing members, the valve spool 13 may also comprise a clamping device 48 which communicates with a tachometer-controlled sensor 47 serving as an emitter ascertaining the driving operation of the vehicle, and as soon as the vehicle is in movement, arrests the valve spool in its last standstill position. Sensor 47 shown in FIGS. 1 and 2, is provided for determining magnitude carried by the liftable axle and a load control value is emitted accordingly. In this way, all those changes in pressure caused by the driving operation can be eliminated which could otherwise bring about a faulty control of the lifting device.

FIG. 2 shows a vehicle frame 1 which is designed similar to that of FIG. 1. Connected to the vehicle frame 1 are spring brackets 25 and intermediate bearing brackets 26 while the outer ends of leaf springs 27, which are connected to a non-liftable axle 28 and the outer ends of leaf springs 29 to which the liftable axle 30 is connected, are linked to the spring brackets 25. Those ends of the leaf springs 27 and 29 which face each other are connected to beams or rockers 31 which in their turn are connected to the intermediate bearing brackets 26. Those ends of the beams 31 which face the non-liftable axle 28 are engaged by a lifting device 32 which in an advantageous manner engages both sides of the vehicle frame. The lifting device 32 comprises a hydraulic cylinder piston system having both sides of the piston connected to a hydraulic conduit 33, 33' each. These conduits 33, 33' lead to a control element 34 and from there to a sump 35 and the pressure side of a pressure medium source of hydraulic pump 36. The control element 34 is designed as 4/2-way valve 37 having fixed members 39 connected to the housing portion 38 of said valve 37. The valve 37 is connected through a conduit 40 with a throttle 41 and accordingly is dampened as to its movement and by way of a spring 42 approximately centrally thereof is operatively connected to a control beam 43. Connected to the ends of leaf springs 27 and 29 are yokes 44 against which sleeves 45 of Bowden wires 46 rest. The other end of the sleeves 45 rests against fixed members 39. The inner cable of the Bowden wires 46 is on one hand connected to leafsprings 27 and 29 within the region of the connection of the axles and on the other hand the inner cable of the Bowden wire 46 is connected to the ends of the control beam 43 so that the load dependent spring stroke of the leaf springs 27 and 29 acts in an additive manner on the 4/2-way valve 37.

In the illustrated position, the valve 37 occupies the lowering control position so that the lifting device is in its floating position, in connection with which through suitable cross sectional selection of the hydraulic conduits 33, a throttling of the lifting movement and thus a dampening for the pendulum movements of the beam 31 may be effected. When the load of the vehicle is reduced, the leaf springs 27 and 29 bend and through the inner cable of the Bowden wires 46 pull the control beam 43 downwardly and cause valve 37 to move into its second position so that the pressure side of the lifting device 32 communicates with the hydraulic pump or pressure medium source 36 and moves the beams 31 in combination with the leaf springs 27 and 29 and the wheels into the dot-dash position. Due to this lifting operation, the load dependent bending of the leaf spring 29 of the liftable axle 30 in a direction toward the yokes 44 is increased in distance by a further reduction in the load, and this distance is decreased on the non-liftable axle 28 due to additional load in proportion with the liftable axle 30. These movements are transmitted between the fixed members 39 and the ends of the control beams 43 but equalize inasmuch as they are directed counter to each other so that no displacement of the valve 37 and thus no faulty control is effected. Instead of the conduit 40 in combination with the throttle 41, also a clamping device described in connection with FIG. 1, may be operatively connected to the valve 37. As soon as the vehicle is in motion, this clamping device holds fast and secures the valve 37 so that changes in the load dependent bending of the spring in view of unevenness of the ground will not cause faulty controls. Of course, the lifting device may also be designed as a pneumatically operable device.

It is, of course, to be understood that the present invention is, by no means, limited to the specific showing in the drawings, but also comprises any modifications within the scope of the appended claims.

What we claim is:

1. An automatic control apparatus for a lifting device of a liftable axle of a double-axle unit of multiple axle vehicles, including also a non-liftable axle and which controls the lifting dependent upon axle loading, comprising in combination:

a frame having two of the axles combined in a double-axle unit yieldingly connected to said frame;

a lifting device for lifting and lowering the liftable axle of the double-axle unit;

a sensor for determining magnitude of load carried by the liftable axle in elevated and lowered positioning respectively separately emitting corresponding control values for the particular loading of both the liftable axle and the non-liftable axle, said sensor adding the total load of the double-axle unit collectively for purposes of emitting thereof; and a control element for actuating said lifting device only in response to and dependent upon the total load control value emitted collectively from said sensor to eliminate oscillating pendulum action in lift positioning and to assure stable traveling behavior of the multiple axle vehicles.

2. An automatic control apparatus for a lifting device of a liftable axle of a double-axle unit of multiple axle vehicles, including also a non-liftable axle and which controls the lifting dependent upon axle loading, comprising:

a frame having two of the axles combined in a double-axle unit yieldingly connected to said frame;

a lifting device for lifting and lowering the liftable axle of the double-axle unit;

a sensor for determining magnitude of load carried by the liftable axle in elevated and lowered positioning respectively separately emitting corresponding control values for the particular loading of the liftable axle and the non-liftable axle, said sensor adding the total load of the double-axle unit for purposes of emitting thereof;

a control element for actuating said lifting device in response to and dependent upon the total load control value emitted from said sensor and;

a stepped piston and spring bellows as axle springs having load dependent pressure therein for the non-liftable axle and having further spring bellows pressureless in lifted condition as well as pressure-loaded dependent upon load in lowered condition for the liftable axle, said bellows pressure being effective upon said stepped piston separately in identical direction against spring force with longitudinal shifting and displacement of said stepped piston being transmitted to said control element.

3. An automatic control apparatus according to claim 2, including a control valve spool axially shiftable and interconnecting said stepped piston and said control element, said control valve spool in one end position thereof engaging said lifting device with pressure and simultaneously venting the lifting device of said liftable axle as well as simultaneously connecting the spring bellows of the liftable axle with the spring bellows of the non-liftable axle.

4. An automatic control apparatus according to claim 2, further comprising a damping device including a spring and throttle means provided therewith to preclude response of said control element prematurely to changes in loading.

5. An automatic control apparatus for a lifting device of a liftable axle of a double-axle unit of multiple axle vehicles, including also a non-liftable axle and which controls the lifting dependent upon axle loading, comprising:

a frame having two of the axles combined in a double-axle unit yieldingly connected to said frame;

a lifting device for lifting and lowering the liftable axle of the double-axle unit;

a sensor for determining magnitude of load carried by the liftable axle in elevated and lowered positioning respectively separately emitting corresponding control values for the particular loading of the liftable axle and the non-liftable axle, said sensor adding the total load of the double-axle unit for purposes of emitting thereof;

a control element for actuating said lifting device in response to and dependent upon the total load control value emitted from said sensor, and;

mechanical springs as axle springs having load-dependent paths thereof serving as control values whereby said lifting device engages the liftable axle such that axle springs of the liftable axle in lifted condition of this liftable axle are unloaded.

6. An automatic control apparatus according to claim 5, including yoke means supporting and connecting said mechanical springs with a spacing of support locations serving as control values.

7. An automatic control apparatus according to claim 5 wherein Bowden wires transmit the spacing values between said yoke means and axle support locations of said mechanical springs on the non-liftable axle and the liftable axle, and a control beam is provided therewith having both ends thereof receiving the spacing values transmitted by said Bowden wires as well as having a middle of said control beam engaging said control element.

8. An automatic control apparatus according to claim 7 wherein said sensor is tachometer controlled, and a clamping means dependent upon traveling by way of said tachometer controlled sensor being actuated to retain at least one of said Bowden wires and said control element elastically linked and held in accordance with positioning determined while the vehicle is at rest.

9. An automatic control apparatus according to claim 5 in which said control element is a 4/2-way valve, and a pressure-medium source connected to said lifting device in one position of said valve, said valve in another position connecting said lifting device into a floating position.

* * * * *